US009923441B2

(12) United States Patent
Song et al.

(10) Patent No.: US 9,923,441 B2
(45) Date of Patent: Mar. 20, 2018

(54) STATOR OF LINEAR COMPRESSOR AND FIXING METHOD THEREOF, LINEAR MOTOR, AND LINEAR COMPRESSOR

(71) Applicants: HAIER GROUP CORPORATION, Qingdao, Shandong (CN); HAIER GROUP TECHNIQUE R&D CENTER, Qingdao, Shandong (CN); QINGDAO HAIER JOINT STOCK CO., LTD., Qingdao, Shandong (CN)

(72) Inventors: Bin Song, Shandong (CN); Hyeomgkook Lee, Shandong (CN); Saina Yan, Shandong (CN); Zhiqiang Zhao, Shandong (CN); Sheng Xu, Shandong (CN); Biao Li, Shandong (CN)

(73) Assignees: HAIER GROUP CORPORATION, Quingdao, Shandong (CN); HAIER GROUP TECHNIQUE R&D CENTER, Quingdao, Shandong (CN); QINGDAO HAIER JOINT STOCK CO., LTD., Quingdao, Shandong (CN)

( * ) Notice: Subject to any disclaimer, the term of this patent is extended or adjusted under 35 U.S.C. 154(b) by 529 days.

(21) Appl. No.: 14/603,111

(22) Filed: Jan. 22, 2015

(65) Prior Publication Data

US 2015/0132161 A1 May 14, 2015

Related U.S. Application Data

(63) Continuation of application No. PCT/CN2013/086692, filed on Nov. 7, 2013.

(30) Foreign Application Priority Data

Nov. 7, 2012 (CN) .......................... 2012 1 0442338
Nov. 23, 2012 (CN) .......................... 2012 1 0482810
Jul. 22, 2013 (CN) .......................... 2013 1 0307705

(51) Int. Cl.
*H02K 1/14* (2006.01)
*H02K 33/00* (2006.01)
(Continued)

(52) U.S. Cl.
CPC ............. *H02K 33/00* (2013.01); *F04B 35/04* (2013.01); *F04B 35/045* (2013.01); *F25B 1/005* (2013.01);
(Continued)

(58) Field of Classification Search
CPC ........................... H02K 1/145; H02K 15/022
(Continued)

(56) References Cited

U.S. PATENT DOCUMENTS 3,828,211 A * 8/1974 Laronze ............... H02K 41/025
310/13
5,844,332 A * 12/1998 Lee ........................ H02K 41/02
187/250
(Continued)

FOREIGN PATENT DOCUMENTS

CN 1508939 A 6/2004
CN 1619916 A 5/2005
(Continued)

OTHER PUBLICATIONS

International Search Report dated Jan. 24, 2014 for Application No. PCT/CN2013/086692.

*Primary Examiner* — Burton Mullins
(74) *Attorney, Agent, or Firm* — Tim Tingkang Xia; Locke Lord LLP

(57) ABSTRACT

In one aspect of the present invention, a stator of a linear compressor comprises first stator pieces that are circumferentially and sequentially arranged about an axial direction and are radially disposed, second stator pieces that are provided between outer parts of the adjacent first stator pieces, and an outer side, away from a motor axis, of the second stator pieces assembled at an outer circumference of
(Continued)

the stator. The stator can reduce the magnetic losses of the stator caused by the gap, and improve the efficiency of the motor. It can also improve the performance, stability, durability and reliability of the linear compressor. It can also reduce the bulk of the linear compressor.

24 Claims, 10 Drawing Sheets

(51) Int. Cl.
*H02K 33/06* (2006.01)
*F04B 35/04* (2006.01)
*F25B 1/00* (2006.01)
*H02K 1/34* (2006.01)
*H02K 15/02* (2006.01)

(52) U.S. Cl.
CPC ............... *H02K 1/14* (2013.01); *H02K 1/145* (2013.01); *H02K 1/34* (2013.01); *H02K 15/022* (2013.01); *H02K 33/06* (2013.01)

(58) Field of Classification Search
USPC ........................................................ 310/257
See application file for complete search history.

(56) References Cited

U.S. PATENT DOCUMENTS

| | | | | |
|---|---|---|---|---|
| 6,060,810 A * | 5/2000 | Lee | ........................... | H02K 1/12 310/14 |
| 6,628,018 B2 * | 9/2003 | Song | ........................ | H02K 1/12 310/12.24 |
| 6,812,606 B2 * | 11/2004 | Kang | ........................ | H02K 1/12 310/194 |
| 7,323,800 B2 * | 1/2008 | Lee | ........................... | H02K 33/18 310/14 |
| 7,397,161 B2 * | 7/2008 | Kim | ..................... | F04B 35/045 310/14 |
| 7,413,420 B2 * | 8/2008 | Kim | ........................ | H02K 1/146 417/417 |
| 2006/0093495 A1 * | 5/2006 | Oh | ........................ | F04B 35/045 417/417 |

FOREIGN PATENT DOCUMENTS

| | | |
|---|---|---|
| CN | 1858976 A | 11/2006 |
| CN | 1866696 A | 11/2006 |
| CN | 101971468 A | 2/2011 |
| JP | 2003309964 A | 10/2003 |

* cited by examiner

STATOR OF LINEAR COMPRESSOR AND FIXING METHOD THEREOF, LINEAR MOTOR, AND LINEAR COMPRESSOR

CROSS-REFERENCE TO RELATED APPLICATIONS

This application is a continuation application of PCT Patent Application No. PCT/CN2013/086692, filed Nov. 7, 2013, which itself claims the priority of Chinese Patent Application Nos. 201210442338.3, filed Nov. 7, 2012, 201210482810.6, filed Nov. 23, 2012, and 201310307705.3, filed Jul. 22, 2013. Each of the above disclosures is incorporated herein in its entirety by reference.

FIELD OF THE INVENTION

The present invention relates generally to linear compressors, and more particularly, to a stator of a linear compressor and a fixing method thereof, and a linear motor and a linear compressor including such a stator.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

As shown in FIG. 1, a linear compressor has a casing 1. An air inlet 1a for a refrigerant to enter and a vent 1b for discharging the refrigerant are opened on the casing 1. A motor 2 and an oil supply pipe 3 for conveying a lubricant 6 to the motor 2 are installed inside the casing 1. The motor 2 has a shell 21. The shell 21 is supported on an inner wall surface of the casing 1 by using multiple springs. Parts such as a cylinder 11, a piston 12, a compression cavity 18, a discharging cavity 19 connected to the vent 1b, an inner stator 14, a coil 17 placed inside the inner stator 14, an outer stator 15, a rotor 16, and a rotor frame 22 are installed inside the shell 21. Of them, the cylinder 11, the inner stator 14, the outer stator 15 and the rotor 16 are cylindrical. The outer stator 15 is fixed on an inner wall surface of the shell 21.

A front flange 13 that provides a fixing effect is disposed at the right end (corresponding to the right side of FIG. 1) of the shell 21. The front flange 13, the cylinder 11, the compression cavity 18, the discharge cavity 19, the inner stator 14, and the coil 17 are connected together to the outer stator 15 and the shell 21. During the movement of the piston 12, the movements of these members are synchronized. The rotor 16 is fixed on the rotor frame 22, which are both supported between the inner stator 14 and the inner wall surface of the shell 21 through a spring 5. When the coil 17 is electrified, the magnetic field intensity of the magnetic field formed by the inner stator 14 and the outer stator 15 is changed. Under the magnetic field force, the rotor 16 moves back and forth (in a left-right direction in FIG. 1) along an axis thereof. The rotor 16 actuates, through the rotor frame 22, the piston 12 to move back and forth along the axis of the cylinder 11, so as to compress the refrigerant gas inside the compression cavity 18 to achieve refrigeration.

As shown in FIG. 2 and FIG. 3, the stator of the motor of the linear compressor generally comprises several stator pieces 7 that are circumferentially and sequentially arranged about an axial direction and are radially disposed. Each stator piece 7 may be formed by stacking the same stator laminations, that is, by forming a stator lamination group. Because each stator lamination group is arranged and disposed sequentially along the circumferential direction, certain angles are defined between adjacent stator lamination groups. A gap 8 is defined between the angle and an outer circumference of the inner stator. The greater the radial length of the stator lamination group, the greater the spacing between the adjacent stator lamination groups and the outer circumference of the inner stator is, and the greater the gap 8 is. Especially, a stator with a coil inside usually has a relatively large volume, and thus cannot be fixed as tight as a stator without a coil.

Because of the gap 8, a small quantity of silicon steel sheets is actually used, and magnetic saturation occurs easily. When magnetic saturation is reached, if a current is further increased, the magnetic field intensity no longer increases. Magnetic saturation occurring to stacked silicon steel sheets, it becomes difficult to increase the capacity of a motor. A potential problem for the linear compressor may be that an electromagnetic force fails to drive a piston to the top dead center, therefore the compression efficiency is lowered and the efficiency of the motor is lowered.

In addition, when the motor is electrified and working, after an alternating current flows through the excitation coil on the inner stator, an induced magnetic field is produced between the inner stator and the outer stator, the interval defined between the combination forms a magnetically conductive resistance to cause a magnetic loss, therefore lower the efficiency of the motor of the compressor.

Further, because there are a number of gaps within the stators, a fringe effect exists in the magnetic field around the gap, which causes the coil of the additional loss and a relatively high temperature rise, and in severe cases, the safety and service life of the motor are affected. To avoid the occurrence of magnetic saturation, the volume of a stator in which a coil is placed may be increased to lower the magnetic flux density; however, this causes an increased volume of the motor of the linear compressor, and further causes an increased volume of the compressor.

Moreover, in the process of manufacturing the linear compressor, these stator laminations need to be fixed to form into a cylindrical part. For the existing linear compressors, stator laminations are mainly fixed by two methods, specifically:

1) A corresponding protrusion or groove is stamped on the stator laminations, and adjacent stator laminations fit each other by using these protrusions and grooves. By using this method, stator laminations are not securely fixed, and become loose easily when a motor vibrates during working.

2) As shown in FIG. 4 and FIG. 5, grooves are defined at the side end of each stator lamination. When these stator laminations are formed into a cylindrical part, an annular fixing component 4 is configured in interference fit manner inside an annular space define within a groove. Because interference fit is needed in this method, during assembly, because of the effect of pressure, deformation can easily occur to a stator lamination, so that the overall size assembly precision of a linear compressor of a motor is affected.

Therefore, a heretofore unaddressed need exists in the art to address the aforementioned deficiencies and inadequacies.

SUMMARY OF THE INVENTION

One of the objectives of the present invention is to provide a high-efficiency, small-volume, and high-reliability stator for a linear compressor, and a linear motor and a linear compressor including such a stator, and to provide a fixing structure and method for a stator lamination that can improve overall fastness of a stator.

In one aspect, the present invention relates to a stator of a linear compressor, which includes first stator pieces that are circumferentially and sequentially arranged about an axial direction and are radially disposed, second stator pieces that are provided between the outer parts of adjacent first stator pieces, and an outer side, away from a motor axis, of the second stator pieces assembled at an outer circumference of the stator.

In one embodiment, the second stator piece comprises two arms extending toward the outer circumference of the stator, wherein the two arms shape corresponding to the first stator pieces.

In certain embodiments, the second stator piece further comprises a bottom connected to the two arms of the second stator piece, and a cavity defined between the bottom and the two arms having the same shape as a cavity defined between the first stator pieces for accommodating an excitation coil.

In one embodiment, each of the first stator pieces and the second stator pieces is formed of a single stator sheet or a stack of multiple stator laminations.

In one embodiment, the stator further comprises short stator sheets disposed on the two sides of the first stator pieces, wherein each short stator sheet has a radial length shorter than that of each first stator piece, and the bottoms of the short stator sheets are fixed to the bottoms of the corresponding first stator pieces, and the second stator pieces are fixed to the short stator sheets of the adjacent first stator pieces.

In certain embodiments, the length of the short stator sheet is the radial lengths difference of the first stator piece and the second stator piece.

In certain embodiments, the stator laminations on the two sides of the first stator pieces have bending portions opposite to the first stator pieces, the bending portions are disposed parallel to the angle bisectors of the angles formed by the adjacent first stator pieces, and the second stator pieces are fixed by extending into a space defined between the bending portions of the adjacent first stator pieces.

In certain embodiments, the radial length of the bending portion is the same as that of the second stator piece.

In one embodiment, a filling piece is further provided for at least one of spaces surrounded by the two adjacent first stator pieces and the second stator pieces.

In one embodiment, each of the first stator pieces, the second stator pieces, and the filling pieces is made of a magnetically conductive material.

In certain embodiments, the magnetically conductive material comprises one or any combination of a ferrite, a rare-earth material, and a powder metallurgy material.

In certain embodiments, the cross section of the filling piece is triangular or trapezoidal.

In certain embodiments, the filling piece is a silicon steel sheet.

In certain embodiments, the filling piece is formed by stacking multiple parallel silicon steel sheets.

In certain embodiments, the filling piece is formed by stacking multiple silicon steel sheets bent into a V shape.

In certain embodiments, an interval is defined between at least one filling piece and the first stator piece or second stator piece.

In certain embodiments, the stator laminations are arranged in a cylindrical shape, protrusions protruding along the axial direction or toward an outer side of a radial direction of the cylindrical shape are formed on the stator laminations, fixing components are arranged on the stator laminations at both ends or lateral surfaces of the cylindrical shape corresponding to the protrusions, and through holes defined within the fixing component are for the protrusions to pass through.

In certain embodiments, the protrusions are formed on stator laminations located on the two sides of the first stator piece and/or second stator piece, and the protrusions are bent in opposite directions to each other.

In certain embodiments, the protrusions are formed on all stator laminations that belong to a same first stator piece and/or second stator piece, and at least the protrusions on stator laminations located on the two sides of the first stator piece and/or second stator piece are bent in opposite directions to each other.

In certain embodiments, a groove is defined within the fixing component, and two sidewalls of the groove are in contact with the stator laminations located on the two sides of the first stator piece or second stator piece.

In certain embodiments, the groove is defined on an interface of which the fixing component is in contact with the first stator piece or second stator piece, and/or does not penetrate the thickness direction of the fixing component.

In certain embodiments, a first groove for configuring the fixing component is defined on the end surface of the cylindrical shape on the stator laminations, and the groove defined on an edge of the fixing component penetrates the thickness direction of the fixing component.

In certain embodiments, the fixing component is annular, and the groove is formed on an inner circumferential edge and/or an outer circumferential edge of the annular fixing component.

In another aspect, the present invention relates to a linear motor including the foregoing stator.

In another aspect, the present invention relates to a linear compressor including the foregoing linear motor.

In another aspect, the present invention relates to a fixing method for a stator of a linear compressor, wherein the stator comprises first stator pieces that are circumferentially and sequentially arranged about an axial direction and are radially disposed, second stator pieces that are provided between outer parts of the adjacent first stator pieces, the first stator piece or second stator piece being a single stator sheet or formed by stacking multiple stator laminations arranged in a cylindrical shape, the fixing method comprises:

forming protrusions at least on the stator laminations located on the two sides of the first stator piece or second stator piece, the protrusions protruding toward an outer side along the axial direction or a radial direction of the cylindrical shape;

configuring a fixing component on an end surface or a lateral surface of the cylindrical shape on the stator laminations, and defining through holes on the fixing component for the protrusions to pass through; and passing the protrusions through the through holes, and bending the protrusions of the stator laminations located on the two sides of the first stator piece or second stator piece in opposite directions to each other respectively.

Among other things, in the present invention, the structure of the stator in the linear compressor is improved, and the gap defined within the outer circumference of the stator is used. A smaller second stator piece is inserted in a relatively large gap defined between the first stator pieces so as to reduce magnetic loss caused by the gap in the stator and to enhance efficiency of the motor, and to further enhance the performance of a linear compressor. In addition, in the present invention, a filling piece is further disposed in a gap defined between adjacent first stator pieces and second stator pieces, so that the stator of the present invention has a more compact and tighter structure. The occurrence of magnetic saturation of a motor of a linear compressor is effectively avoided, and difficulties of increasing the magnetic induction intensity of the gap between the inner and outer stators and increasing the compression force because of magnetic saturation are reduced. The motor of the linear compressor has a higher driving force and more desirable stability. Performance and reliability of the linear compressor can be improved, and the volume of the linear compressor can be further reduced. Moreover, in the present invention, a through hole is disposed on a fixing component, and a protrusion for inserting in the through hole is formed on a stator lamination. The protrusion and the through hole can fit each other to fix the stator lamination to improve overall fastness of the stator.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
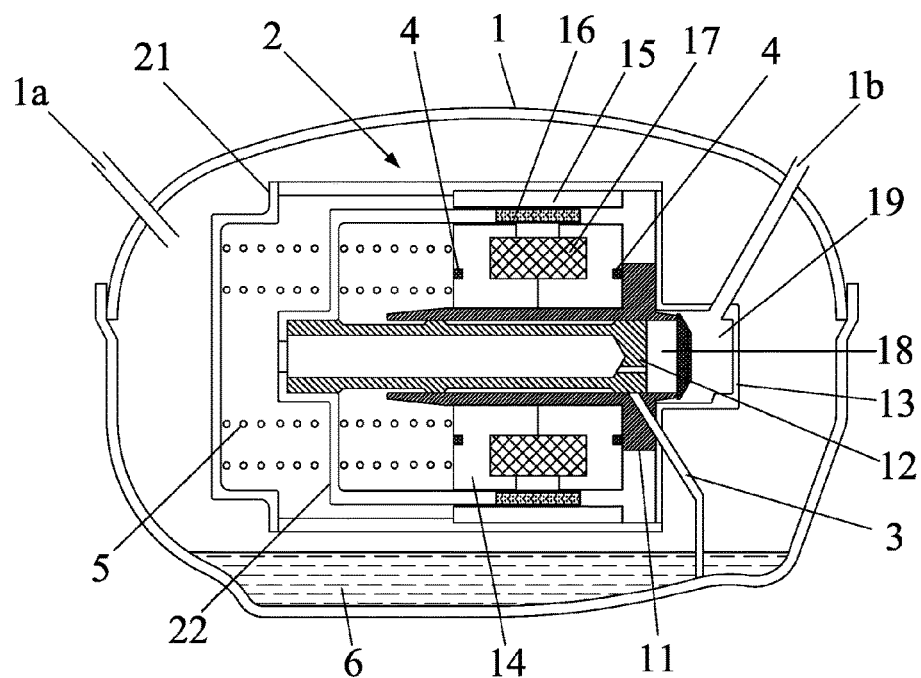
FIG. 1 is a schematic structural view of an existing linear compressor in the prior art.
Figure 2:
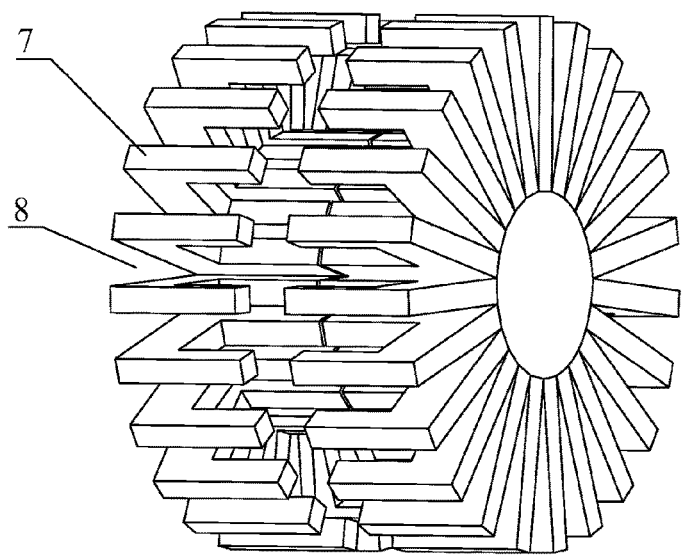
FIG. 2 is a schematic structural view of a stator in the prior art.
Figure 3:
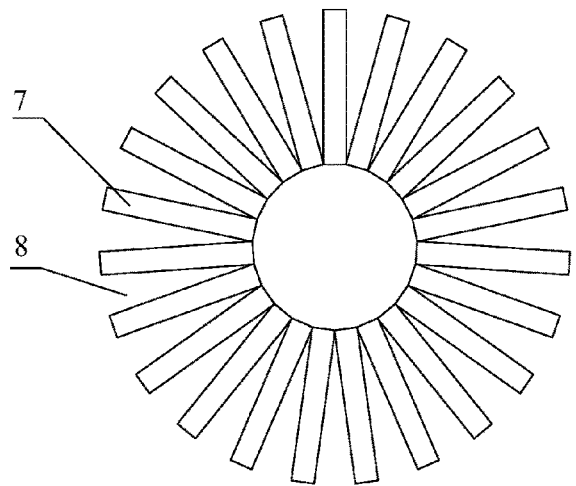
FIG. 3 is a structural front view of a stator in the prior art.
Figure 4:
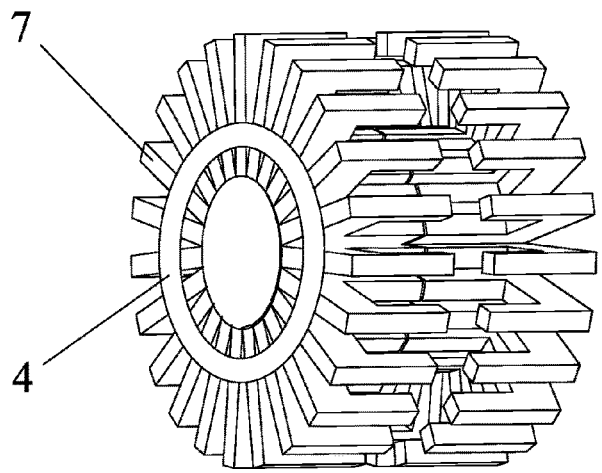
FIG. 4 is a schematic structural view that a stator lamination and a fixing component fit each other in the prior art.
Figure 5:
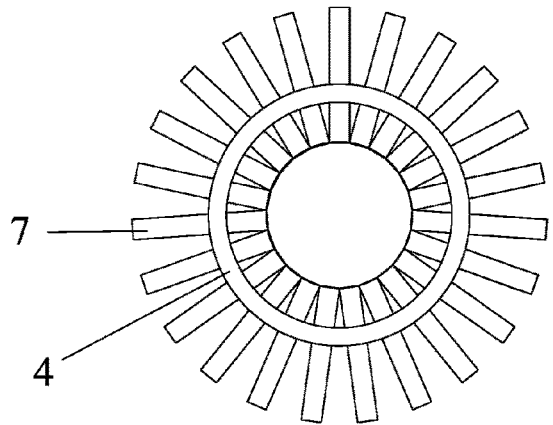
FIG. 5 is a top view that a stator lamination and a fixing component fit each other in the prior art.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "inner side of the stator" generally refers to an inner circumferential side of an inner stator; the term "outer side of the stator" generally refers to an outer circumferential side; the term "bottom of the stator piece" generally refers to a part, facing an inner circumference of the stator, of a stator piece; and the term "outer side of the stator piece" generally refers to a part facing an outer circumference of the stator.

The description will be made as to the embodiments of the invention in conjunction with the accompanying drawings in FIGS. 1-21. In accordance with the purposes of this invention, as embodied and broadly described herein, this invention, in certain aspects, relates to linear compressors, a stator of a linear compressor and a fixing method thereof, and a linear motor and a linear compressor including such a stator.

Figure 6:
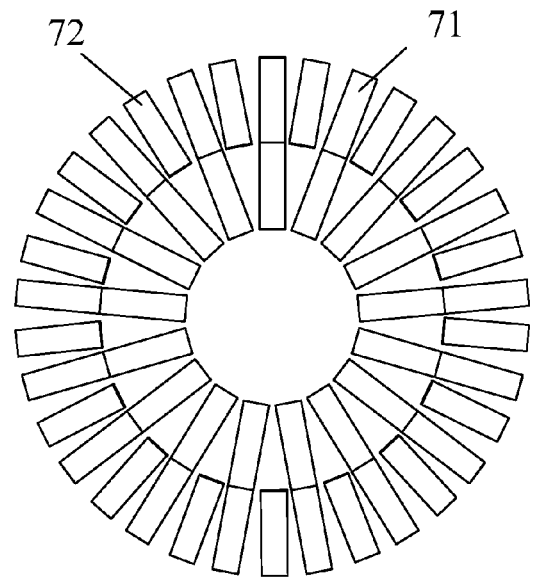
FIG. 6 is an axial schematic view of a first embodiment of a stator according to one embodiment of the present invention.
Figure 7:
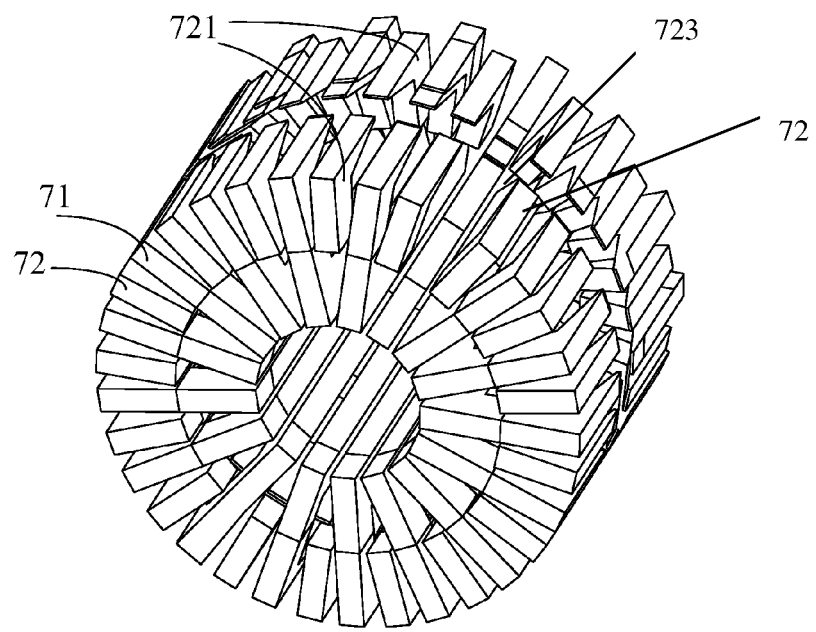
FIG. 7 is a schematic perspective view of one embodiment of the stator according to the present invention.

FIG. 6 and FIG. 7 show one embodiment of a stator of a linear compressor according to the present invention, where the stator of a linear compressor comprises: several first stator pieces 71 that are circumferentially and sequentially arranged about an axial direction and are radially disposed, second stator pieces 72 that are provided between outer parts of adjacent first stator pieces 71, and an outer side, away from a motor axis, of the second stator pieces 72 assembled at an outer circumference of the stator. The present invention is particularly suitable for an inner stator in which an excitation coil is mounted. The structure of the stator in a linear compressor is improved, the gap within the outer circumference of the stator is used, and a smaller second stator piece is inserted in a relatively large gap defined between first stator pieces, so as to reduce magnetic loss caused by the gap within the stator and to enhance efficiency of the motor.

The shape of the second stator piece 72 is shown in FIG. 7. The radial length of the second stator piece 72 is less than that of the first stator piece 71. The second stator piece 72 includes two arms 721 extending toward the outer circumference of the stator, and the shapes of the two arms correspond to the first stator piece 71 to facilitate assembly and fabrication. During assembly, the outer side of the second stator piece 72 is fixed at the outer circumference of the stator. In addition, if the radial length of the second stator piece 72 is long, the second stator piece 72 further includes, in addition to the two arms 721 facing the outer circumference of the stator, a bottom 723 connected to the two arms 721. After the above assembly, the cavity within the second stator piece 72 for accommodating excitation coil has the same shape as that of the first stator piece 71 and the bottoms are located at the same axial circumference, so as to facilitate assembly of the excitation coil.

Each of the first stator piece and/or second stator piece may be a single stator sheet, the thickness of which may be fabricated into a sheet or a block depending on needs. Each of the first stator pieces and/or second stator pieces may also be formed by stacking multiple stator laminations, that is, forming a stator lamination group so as to facilitate formation and fabrication of the stator. The second stator piece 72 and the first stator piece 71 are fixed together on a circular stator mounting sheet perpendicular to the motor axis. Alternatively, the second stator piece 72 and the stator lamination are fixed through welding.

Figure 8:
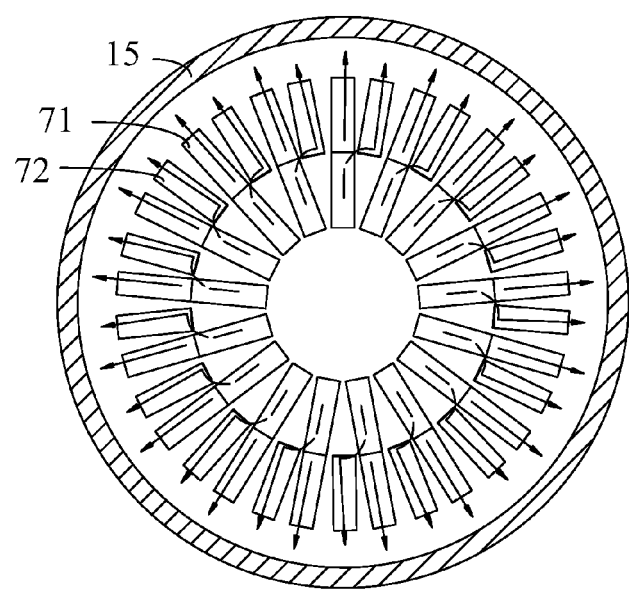
FIG. 8 is a schematic view of distribution of magnetic field lines in one embodiment of the stator according to the present invention.

FIG. 8 shows a schematic view of distribution of magnetic field lines formed by the stator according to this embodiment. A straight line with an arrow denotes a magnetic field line, and an outer circle denotes an outer stator 15. As can be seen, the second stator piece 72 is disposed inside the foregoing gap, thereby reducing the size of the gap and increasing the density of the stator, increasing the magnetic conductivity, and increasing the magnetic field line density between the inner and outer stators. Magnetic loss can be reduced and efficiency of the motor of a compressor is improved.

Figure 9:
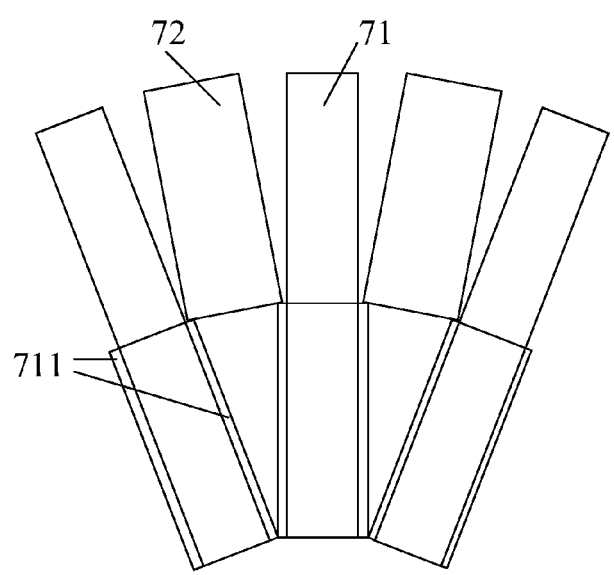
FIG. 9 is a schematic view of another embodiment of a stator according to the present invention.

FIG. 9 shows another stator of a motor of a linear compressor according to one embodiment of the present invention. The differences from the previous embodiment are: one or more stator laminations on the two sides of the stator lamination groups that form the first stator piece 71 are short stator sheets 711; the bottom of the short stator sheet is located at the inner circumference of the stator; the radial length of the short stator sheet is less than that of the stator lamination forming the first stator piece; and the length of the short stator sheet is the radial length difference between the first stator piece 71 and the second stator piece 72. A boss on the two sides of the first stator piece is formed, so that when the second stator piece 72 is assembled, the second stator piece 72 is clamped at the boss for positioning. The structure makes assembly more accurate and convenient, and may keep the radial height of the second stator piece consistent with that of the first stator piece, that is, the outer ends of the second stator pieces and the first stator pieces can form a complete circle together. Distribution of the magnetic density of the stator is then uniform.

Figure 10:
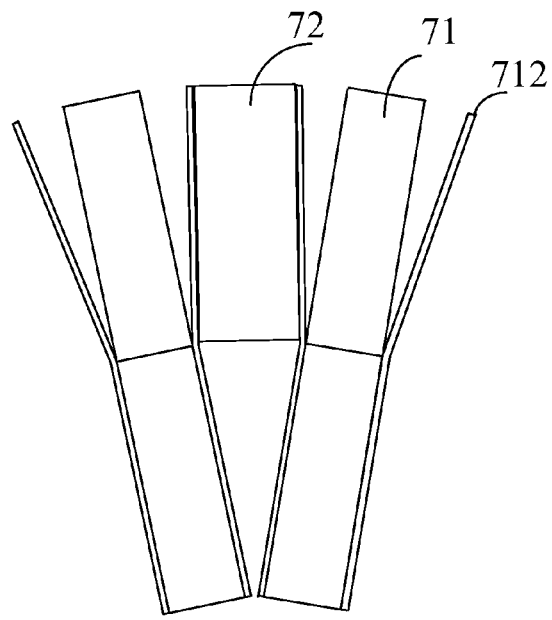
FIG. 10 is a schematic view of yet another embodiment of a stator according to the present invention.

FIG. 10 shows another stator of a motor of a linear compressor according to one embodiment of the present invention. The differences from the first embodiment are: the stator lamination on the two sides of the stator lamination group that forms the first stator piece 71 has a bending portion 712 opposite to the stator lamination group where the stator lamination is located. The radial length of the bending portion 712 is no less than that of the second stator piece 72, and in certain embodiments, is the same as that of the second stator piece 72. The bending portion 712 is disposed parallel to the angle bisector of the angle defined between the adjacent stator lamination groups. When the second stator piece 72 is assembled, the second stator piece 72 is inserted in a space defined between the bending portions of stator sheets on the two sides of the adjacent stator lamination groups oppose to each other for positioning. The structure makes assembly more accurate and convenient, and may keep the radial height of the second stator piece consistent with that of the first stator piece, that is, outer ends of the second stator pieces and the first stator pieces form a complete circle together. Distribution of the magnetic density of the stator is then uniform.

Each of the first stator piece 71 or the second stator piece 72 above may also be integrally fabricated and formed. In certain embodiments, during formation, a filling piece structure whose axial cross section is a sector is directly formed, so as to avoid formation of the foregoing gap.

Figure 11:
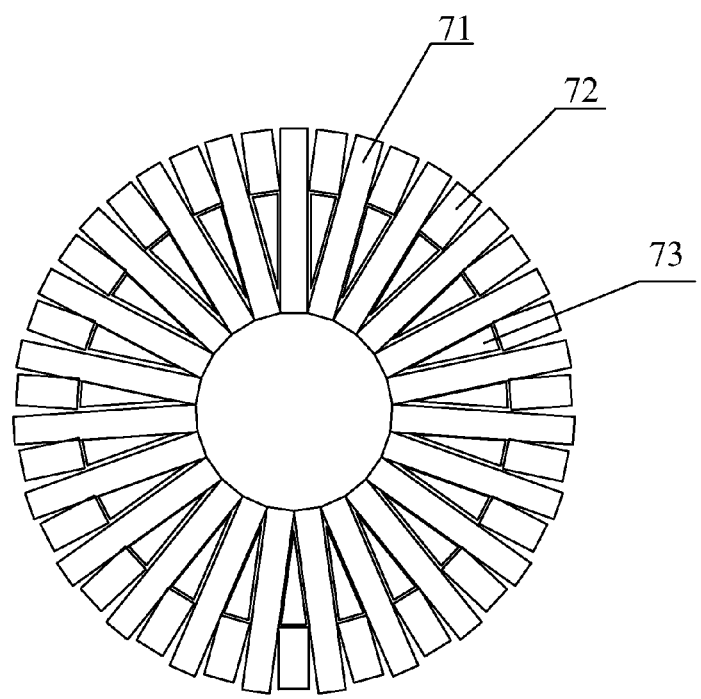
FIG. 11 is a schematic structural view of yet another embodiment of a stator according to the present invention.

As shown in FIG. 11, to further increase the density of the inner stator, a filling piece 73 may be further provided for at least one of the spaces surrounded by the two adjacent first stator pieces 71 and the second stator pieces 72.

The first stator piece, the second stator piece, and the filling piece are all made of a magnetically conductive material, so as to improve the magnetic conductivity of the inner stator, thereby improving magnetic density, effectively lowering the magnetic loss and enhancing the efficiency and optimizing the motor. The first stator piece 71 and/or second stator piece 72 may be comprised of silicon steel sheets or other magnetic conductive materials. In certain embodiments, a magnetic conductive material may be one or any combination of a ferrite, a rare-earth material, and a powder metallurgy material.

In one embodiment, the filling piece 73 may be disposed in all spaces depending on needs, or the filling piece 73 may also be disposed only in some of the spaces, while the rest of the spaces are reserved for bolts to pass through.

In the embodiment shown in FIG. 11, the cross section of the filling piece 73 is triangular. In other embodiments, the cross sections of the filling piece 73 may also be trapezoidal or in other shapes. The triangular or trapezoidal shape may make it more convenient in production and processing to insert the filling piece 73 between the first stator piece 71 and the second stator piece 72. The filling piece 73 may be a whole body formed by laminating powder metallurgy materials, or may also be formed by stacking multiple silicon steel sheets. The size of the filling piece may be conveniently adjusted by adjusting the number of silicon steel sheets, so that production and processing become more convenient, and utility and adaptability may be improved. That is, only several different kinds of silicon steel sheets need to be processed to adapt to stators for different scales of compressors, thereby greatly lowering the manufacturing cost.

Figure 12:
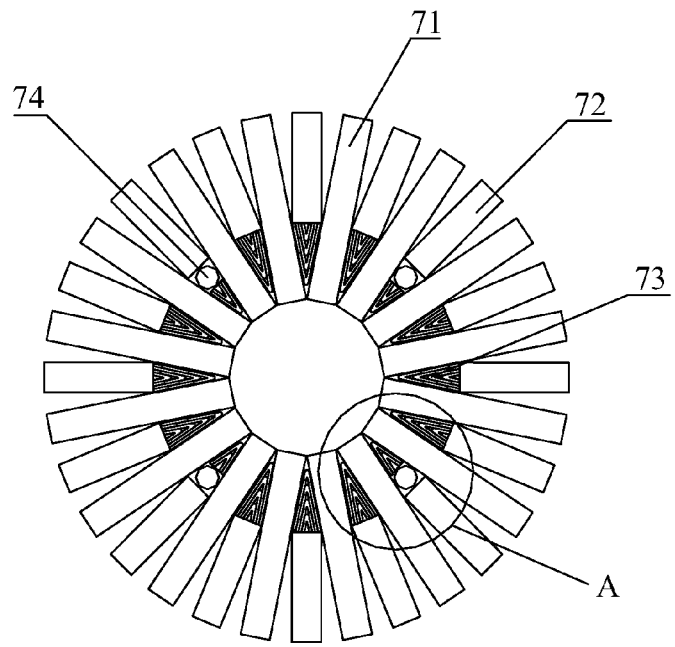
FIG. 12 is a schematic structural view of yet another embodiment of a stator according to the present invention.
Figure 13:
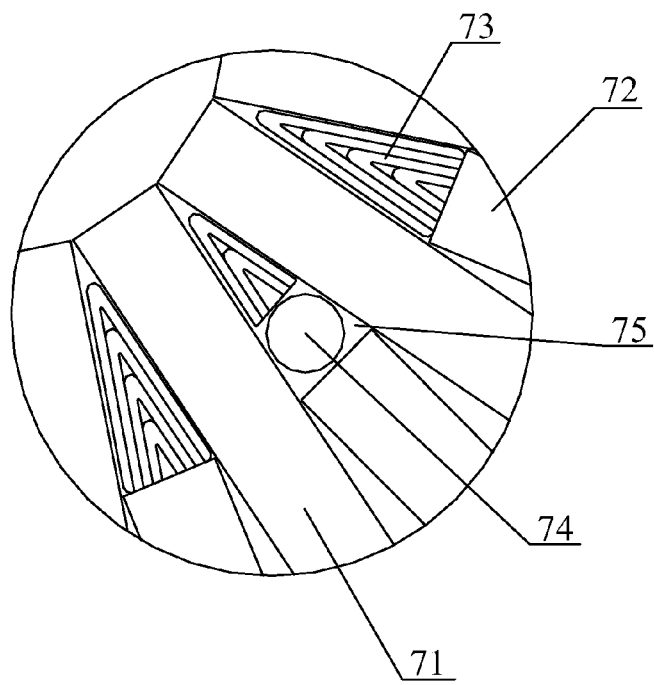
FIG. 13 is a partial enlarged view of region A in FIG. 12.
Figure 14:
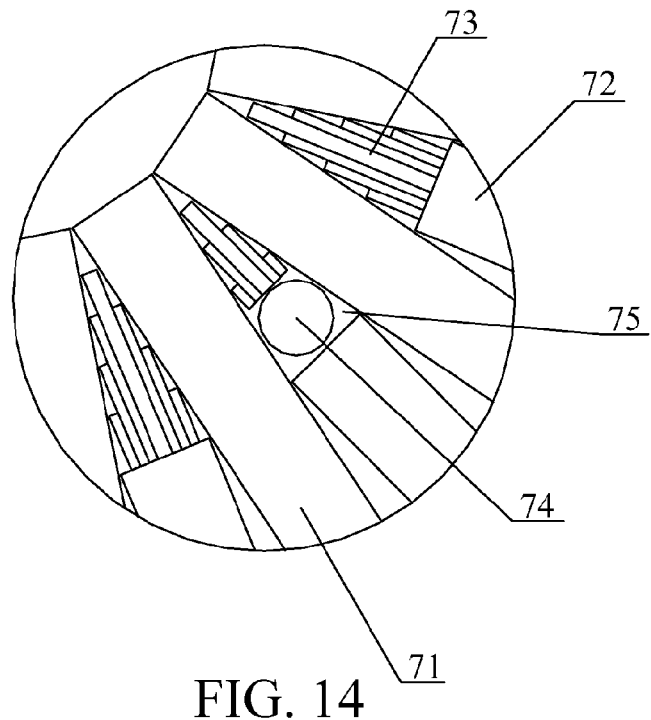
FIG. 14 is a partial enlarged view of one embodiment of a stator according to the present invention.

In the embodiment shown in FIG. 12 and FIG. 13, the filling piece 73 is formed by stacking multiple silicon steel sheets bent into a V shape. In the embodiment shown in FIG. 14, the filling piece 73 is formed by stacking multiple parallel silicon steel sheets.

In addition, an interval 75 may be defined between at least one filling piece 73 and the first stator piece 71, or between the filling piece 73 and the second stator piece 72, or between the filling pieces 73 and the first stator piece 71 and the second stator piece 72. In certain embodiments, these intervals 75 are distributed along the circumferential direction of the stator. The circle formed by the centers of these intervals 75 is concentric with the circle formed by the stator, and a pressing plate bolt 74 is used to pass through the reserved intervals 75 to fix the stator on a front flange.

FIG. 15 to FIG. 19 relate to a fixing structure for a stator according to one embodiment of the present invention. As shown in FIG. 15 to FIG. 19, an inner stator 14 is provided inside a casing 1. The inner stator 14 is formed by multiple stator laminations, and these multiple stator laminations are generally arranged in a cylindrical shape and are divided into multiple stator lamination groups 91. Each stator lamination group 91 forms to be a first stator piece or a second stator piece, and these multiple stator lamination groups 91 are also arranged in a cylindrical shape. At the inner end of the radial direction of the cylindrical part, adjacent stator lamination groups are tightly joined; at the outer end of the radial direction of the cylindrical shape, certain gap is between the adjacent stator lamination groups 91.

Figure 16:
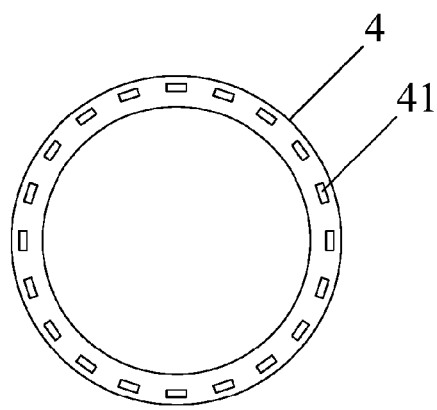
FIG. 16 is a schematic view of a fixing component of a stator lamination in the embodiment shown in FIG. 15.

A fixing component 4 is arranged on the left end surface and the right end surface of the cylindrical part on the inner stator 14 respectively. As shown in FIG. 16, the entire fixing component 4 is an annular plate shaped part. Multiple through holes 41 are defined on the circumference of the annular part on the fixing component 4. The number and intervals of the multiple through holes 41 are consistent with those of the stator lamination groups 91, that is, one stator lamination group 91 corresponds to one through hole 41. The length of the through hole 41 in the circumferential direction of the annular part is slightly greater than or equal to the thickness of the stator lamination group 91 (that is, the thickness of the stack of the multiple stator laminations).

Figure 17:
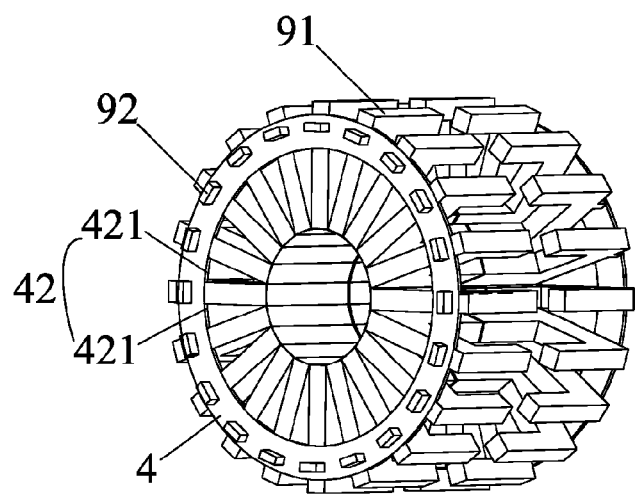
FIG. 17 is a schematic view that the fixing component of the stator lamination and the stator lamination fit each other in the embodiment shown in FIG. 16.

Meanwhile, a groove 42 is defined on the interface of which the fixing component 4 is in contact with the stator lamination group 91, and the groove 42 does not penetrate in the thickness direction of the fixing component 4. As shown in FIG. 17, a protrusion 92 along the axial direction of the cylindrical part and protruding toward the outer side (along the axial direction of the cylindrical part and extending from the center toward two ends) of the cylindrical part is formed on an end surface of the cylindrical part on each stator lamination. The protrusion 92 is rectangular sheet shaped, and the length of the protrusion 92 in the radial direction of the cylindrical part is slightly less than or equal to that of the through hole 41 in the radial direction of the annular part. The protrusions 92 on adjacent stator laminations that belong to a same stator lamination group 91 are tightly joined, and the stack thickness of the multiple protrusions 92 is slightly less than or equal to the length of the through hole 41 in the circumferential direction of the annular part. Because a through hole is defined on the fixing component, and a protrusion for inserting inside the through hole is formed on the stator lamination, as the protrusion and the through hole fit each other, the stator lamination can be fixed, so as to prevent the stator lamination from becoming loose and to improve overall fastness of the stator.

Figure 18:
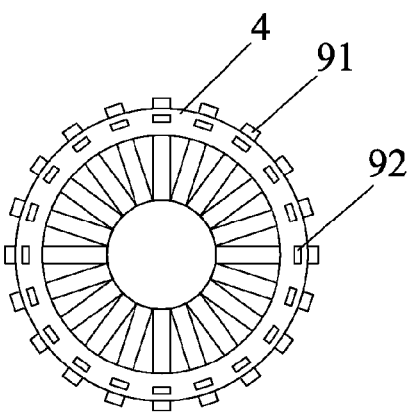
FIG. 18 is a top view of the embodiment shown in FIG. 17, where a protrusion is in an unbent state.
Figure 19:
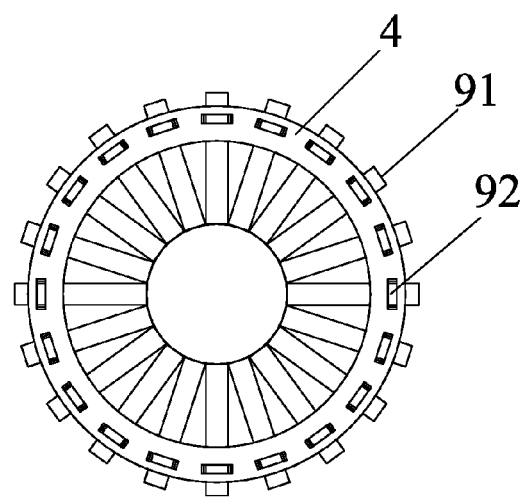
FIG. 19 is a top view of the embodiment shown in FIG. 17, where a protrusion is in a bent state.

As shown in FIG. 17 and FIG. 18, when the fixing component 4 is arranged on the inner stator 14, firstly the protrusion 92 passes through and inserts into the through hole 41, and meanwhile, the stator lamination group 91 is placed inside the groove 42 so that the two sidewalls 421 of the groove 42 are in contact with the outer surfaces of the stator lamination located on the two sides of the stator lamination group (as shown in FIG. 17). Next, as shown in FIG. 19, the two protrusions 92 on the stator lamination located on the two sides of the stator lamination group 91 are bent to a certain angle toward the two sides (opposite to each other), respectively.

From above, the protrusion 92 and the through hole 41 can fit each other so as to fix the stator lamination group 91, thereby helping to improve overall fastness of the inner stator 14. Meanwhile, by using the deformation force of bending the protrusion 92, the stator lamination group 91 may be further fixed, thereby helping to improve overall fastness of the inner stator 14, and further avoiding forming protrusions on every stator lamination, so as to simplify processing of the stator lamination. In addition, because the groove 42 is defined on the fixing component 4, the stator lamination group 91 can insert inside the groove 42, so that the two sidewalls of the groove 42 are held on the two sides of the stator lamination group 91, and the stator lamination group 91 is further fixed by using the groove 42, thereby helping to improve overall fastness of the inner stator 14.

Figure 20:
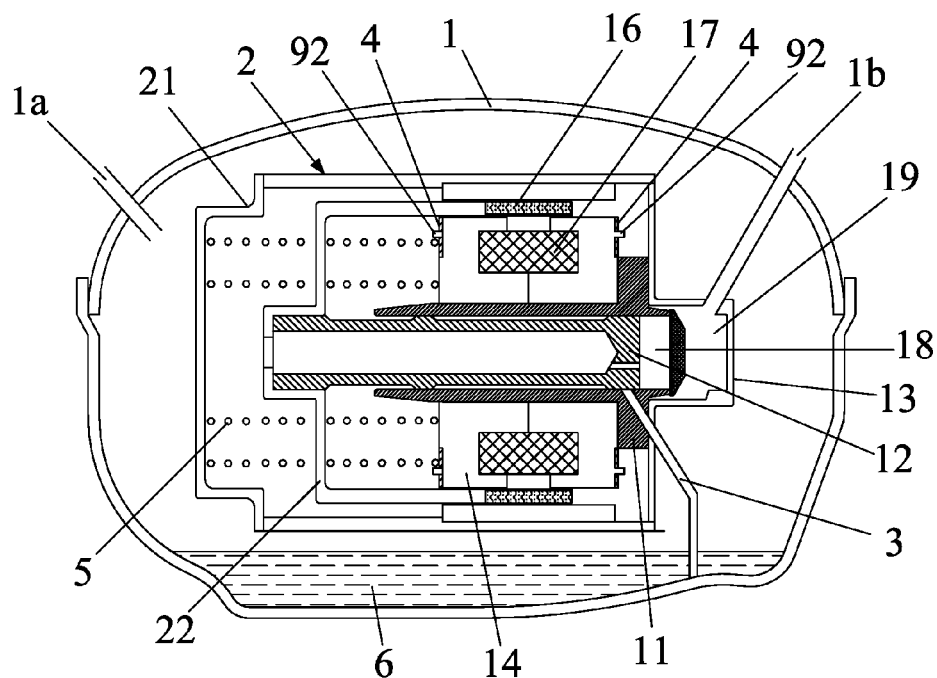
FIG. 20 is a schematic structural view of one embodiment of a fixing structure of a stator according to the present invention.
Figure 21:
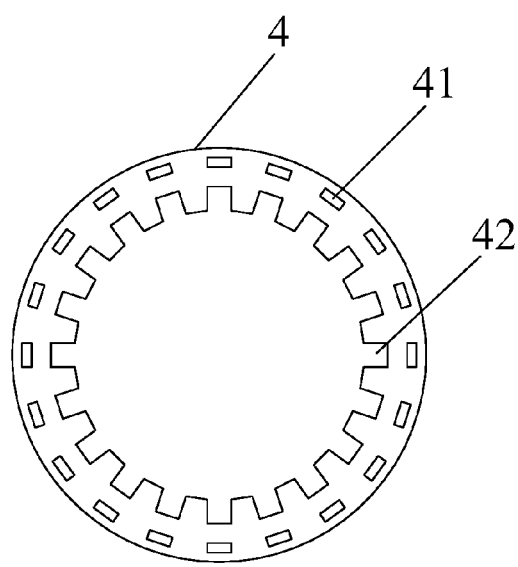
FIG. 21 is a schematic view of a fixing component of a stator lamination in the embodiment shown in FIG. 20.

FIG. 20 and FIG. 21 are a fixing structure for a stator according to another embodiment of the present invention. As shown in FIG. 20 and FIG. 21, the difference of the fixing structure for the stator from the previous embodiment is that multiple grooves 42 are defined on the inner circumference of the annular part on the fixing component 4, the grooves 42 penetrate the thickness direction of the fixing component 4, the number and intervals of the grooves 42 correspond to the number and intervals of the through holes 41, and the length of the groove 42 along the circumferential direction of the annular part is consistent with the length along the circumferential direction of the annular part of the through hole 41, that is, slightly greater than or equal to the thickness of the stator lamination group 91 (that is, the thickness of the stack of the multiple stator laminations).

A first groove (not shown) that is concave toward the inner side of the axial direction of the cylindrical part is formed on an end surface of the cylindrical shape on the stator lamination. The concave length of the first groove along the axial direction of the cylindrical shape is consistent with the thickness of the fixing component 4. The fixing component 4 is arranged inside the first groove. Two sidewalls of the groove 42 are in contact with the outer surfaces of the stator lamination located on the two sides of the stator lamination group 91, and the fixing component 4 and the stator lamination group 91 are on the same plane. Because the groove is defined within the fixing component, and two sidewalls of the groove are in contact with the stator laminations located on the two sides of the stator lamination group, that is, the two sidewalls of the groove are clamped between the two sides of the stator lamination group, the groove can be used to further fix the stator lamination group, thereby helping to improve overall fastness of the stator.

In certain embodiments, as shown in FIG. 21, the through holes 41 and the grooves 42 are of the same number and correspond to each other. Besides, the through holes and grooves may also be disposed alternately along the circumferential direction of the annular shape.

In certain embodiments, as shown in FIG. 21, the grooves 42 are only defined on the inner circumference of the annular part on the fixing component 4. Besides, grooves may be further defined on the outer circumference of the annular part on the fixing component, or on both inner circumference and outer circumference of the annular part on the fixing component.

Figure 15:
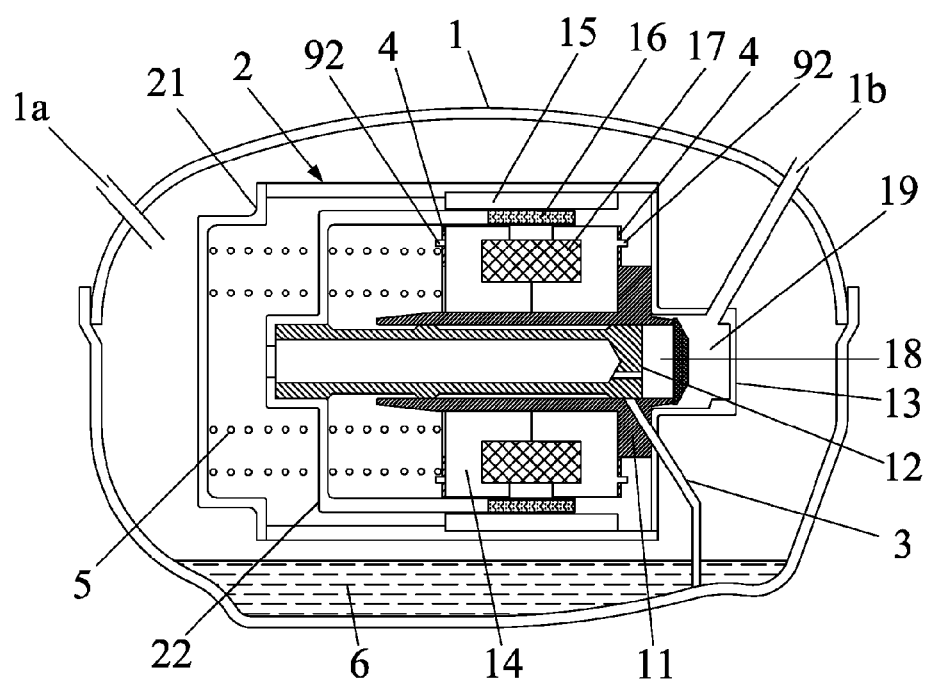
FIG. 15 is a schematic structural view of one embodiment of a fixing structure of a stator according to the present invention.

In certain embodiments, as shown in FIG. 15 and FIG. 20, the fixing component 4 is arranged on the two end surfaces of the cylindrical part on the inner stator 14 respectively. Besides, the fixing component may be further arranged on an outer circumferential surface of the inner stator along the circumferential direction of the cylindrical part. In this case, the protrusion extends toward outside of the radial direction of the cylindrical part (that is, from the inner end of the radial direction to the outer end of the radial direction).

In certain embodiments, as described above, protrusion is formed on every stator lamination that belongs to the same stator lamination group, and only protrusions on the stator laminations located on the two sides of the stator lamination group are bent in opposite directions to each other. Besides, all protrusions on stator laminations that belong to the same stator lamination group may further be divided in two halves, and the two parts of protrusions are bent in opposite directions to each other. In addition, the protrusions may further be formed only on stator laminations located on the two sides of the stator lamination group, and the protrusions are bent in opposite directions to each other.

In another aspect, the present invention relates to a fixing method for a stator of a linear compressor, wherein the stator comprises first stator pieces that are circumferentially and sequentially arranged about an axial direction and are radially disposed, second stator pieces that are provided between outer parts of the adjacent first stator pieces, the first stator piece or second stator piece being a single stator sheet or formed by stacking multiple stator laminations arranged in a cylindrical shape, the fixing method comprises:

forming protrusions at least on the stator laminations located on the two sides of the first stator piece or second stator piece, the protrusions protruding toward an outer side along the axial direction or a radial direction of the cylindrical shape;

configuring a fixing component on an end surface or a lateral surface of the cylindrical shape on the stator laminations, and defining through holes on the fixing component for the protrusions to pass through; and passing the protrusions through the through holes, and bending the protrusions of the stator laminations located on the two sides of the first stator piece or second stator piece in opposite directions to each other respectively.

The foregoing description of the exemplary embodiments of the invention has been presented only for the purposes of illustration and description and is not intended to be exhaustive or to limit the invention to the precise forms disclosed. Many modifications and variations are possible in light of the above teaching. Although not explicitly described in the present invention, other embodiments within the scope of the invention and defined by the claims may be obtained by combining, modifying or changing the exemplary embodiments as described in the present invention.

The exemplary embodiments were chosen and described in order to explain the principles of the invention and their practical application so as to activate others skilled in the art to utilize the invention and various exemplary embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A stator of a linear compressor, comprising:
   first stator pieces that are circumferentially and sequentially arranged about an axial direction and are radially disposed; and
   second stator pieces that are provided between outer parts of adjacent first stator pieces; wherein an outer side, away from a motor axis, of the second stator pieces is aligned with an outer circumference of the stator, wherein at least one of the first stator pieces and the second stator pieces is formed of a stack of stator laminations; and wherein the stator laminations of the first stator pieces are arranged in a cylindrical shape, protrusions protruding along the axial direction and/or toward an outer side of a radial direction of the cylindrical shape are formed on the stator laminations of the first stator pieces, fixing components are arranged on the stator laminations of the first stator pieces at both ends and/or lateral surfaces of the cylindrical shape corresponding to the protrusions, and through holes defined within the fixing component are for the protrusions to pass through.

2. The stator of the linear compressor according to claim 1, wherein one of the second stator pieces comprises two arms extending toward the outer circumference of the stator.

3. The stator of the linear compressor according to claim 2, wherein the one of the second stator pieces further comprises a bottom connected to the two arms of one of the second stator pieces, and a first cavity defined between the bottom and the two arms and a second cavity defined between the first stator pieces for accommodating an excitation coil.

4. The stator of the linear compressor according to claim 1, further comprising short stator sheets disposed on two sides of the first stator pieces, wherein each of the short stator sheets has a radial length shorter than that of each first stator piece, and bottoms of the short stator sheets are fixed to bottoms of corresponding first stator pieces, and the second stator pieces are fixed to the short stator sheets of the adjacent first stator pieces.

5. The stator of the linear compressor according to claim 4, wherein the short stator sheet has a length that is a radial length difference of one of the first stator pieces and one of the second stator pieces.

6. The stator of the linear compressor according to claim 1, wherein the stator laminations on two sides of the first stator pieces have bending portions opposite to the first stator pieces, the bending portions are disposed parallel to angle bisectors of angles formed by the adjacent first stator pieces, and the second stator pieces are fixed by extending into a space defined between the bending portions of the adjacent first stator pieces.

7. The stator of the linear compressor according to claim 6, wherein the bending portion has a radial length same as that of the second stator piece.

8. The stator of the linear compressor according to claim 1, wherein each of the first stator pieces, the second stator pieces, and the filling pieces is made of a magnetically conductive material.

9. The stator of the linear compressor according to claim 8, wherein the magnetically conductive material comprises one or a combination of a ferrite, a rare-earth material, and a powder metallurgy material.

10. The stator of the linear compressor according to claim 1, wherein a filling piece is further provided for at least one of spaces surrounded by two adjacent first stator pieces and the second stator pieces.

11. The stator of the linear compressor according to claim 10, wherein a cross section of the filling piece is triangular or trapezoidal.

12. The stator of the linear compressor according to claim 10, wherein the filling piece is a silicon steel sheet.

13. The stator of the linear compressor according to claim 12, wherein the filling piece is formed by stacking multiple parallel silicon steel sheets.

14. The stator of the linear compressor according to claim 12, wherein the filling piece is formed by stacking multiple silicon steel sheets bent into a V shape.

15. The stator of the linear compressor according to claim 10, wherein an interval is defined between one filling piece and one of the first stator pieces or one of the second stator pieces.

16. The stator of the linear compressor according to claim 1, wherein the protrusions are formed on stator laminations located on two sides of one of the first stator pieces or one of the second stator pieces.

17. The stator of the linear compressor according to claim 1, wherein the protrusions are formed on all stator laminations that belong to a same first stator piece or a same second stator piece.

18. The stator of the linear compressor according to claim 1, wherein a groove is defined within the fixing component, and two sidewalls of the groove are in contact with the stator laminations located on the two sides of one of the first stator pieces or one of the second stator pieces.

19. The stator of the linear compressor according to claim 18, wherein the groove is defined on an interface of which the fixing component is in contact with the one of the first stator pieces or the one of the second stator pieces, and does not penetrate a thickness direction of the fixing component.

20. The stator of the linear compressor according to claim 18, wherein a first groove for configuring the fixing component is defined on an end surface of the cylindrical shape on the stator laminations, and the groove defined on an edge of the fixing component penetrates a thickness direction of the fixing component.

21. The stator of the linear compressor according to claim 20, wherein the fixing component is annular, and the groove is defined on an inner circumferential edge fixing component that is annular.

22. A linear motor comprising the stator according to claim 1.

23. A linear compressor comprising the linear motor according to claim 1.

24. A fixing method for a stator of a linear compressor, wherein the stator comprises first stator pieces that are circumferentially and sequentially arranged about an axial direction and are radially disposed, second stator pieces that are provided between outer parts of adjacent first stator pieces, one of the first stator pieces or the second stator pieces being formed by stacking stator laminations arranged in a cylindrical shape, the fixing method comprises:

forming protrusions at least on the stator laminations located on two sides of the one of the first stator pieces or the second stator pieces, the protrusions protruding toward an outer side along the axial direction or a radial direction of the cylindrical shape;

configuring a fixing component on an end surface or a lateral surface of the cylindrical shape on the stator laminations, and defining through holes on the fixing component for the protrusions to pass through; and passing the protrusions through the through holes, and bending the protrusions of the stator laminations located on the two sides of the one of the first stator pieces or the second stator pieces in opposite directions to each other respectively, wherein the stator laminations of the first stator pieces are arranged in a cylindrical shape, protrusions protruding along the axial direction and/or toward an outer side of a radial direction of the cylindrical shape are formed on the stator laminations of the first stator pieces, fixing components are arranged on the stator laminations of the first stator pieces at both ends and/or lateral surfaces of the cylindrical shape corresponding to the protrusions, and through holes defined within the fixing component are for the protrusions to pass through.

* * * * *